Sept. 12, 1967  A. D. SINGLEY  3,341,098
PIPE CUTTING TOOL
Filed June 17, 1965  3 Sheets-Sheet 3

INVENTOR.
ALFRED D. SINGLEY
BY Fulwider, Patton, Rieber,
Lee and Utecht
ATTORNEYS

United States Patent Office 3,341,098
Patented Sept. 12, 1967

3,341,098
PIPE CUTTING TOOL
Alfred D. Singley, 6819 E. San Carlos St.,
Paramount, Calif. 90723
Filed June 17, 1965, Ser. No. 464,800
20 Claims. (Cl. 225—104)

The present invention relates to cutting tools and more particularly to an improved cutting tool for parting fracturable members such as cast iron pipe and the like.

Over the years, numerous forms of apparatus have been employed to cut cast iron pipe, conduit and other hollow, brittle and fracturable members. One of the more popular forms of such apparatus is the chain-type pipe cutting tool. Conventional chain-type pipe cutting tools operate upon the well recognized principle that hollow articles, especially those formed of relatively brittle materials, can readily and accurately be cut by applying substantially uniform, circumferentially distributed and radially directed pressure to the articles sufficient to effect cutting thereof. In accordance with this principle, such pipe cutting tools generally include a length of flexible, non-extendable cutter chain, carrying a number of evenly spaced disc-shaped cutter elements. The cutter chain is adapted to be wrapped around and tension-squeezed against the pipe to fracture the pipe upon the closing of a clamp connected to the chain. The clamp is manually operated by opening and closing upper and lower elongated handles connected to the clamp, and usually is of a compound leverage type to provide means for developing the tension forces on the cutter chain needed to sever cast iron pipe.

The compound leverage type clamp generally includes upper and lower clamp jaws pivotally connected at a common point intermediate their front and rear ends. The front end of the lower jaw is pivotally secured to the cutter chain while the rear end is pivotally connected to the lower handle. The rear end of the upper jaw is pivotally connected to a connecting arm which in turn is pivotally connected to the upper handle. The front end of the upper jaw includes a detent for releasably receiving a particular transverse connecting pin of the cutter chain after the chain has been wrapped around the pipe. The particular connecting pin for engaging the detent is determined by the circumference of the pipe and therefore varies from pipe size to pipe size.

In this regard, it is very important that the detent engage the proper connecting pin for if there is any slack in the chain after a closing of the clamp jaws, the pipe will not break. Conversely, if the chain does not encircle the pipe upon a closing of the clamp, then nonuniform radial squeezing forces are exerted on the pipe, and if a break occurs in the pipe, it is usually rough and uneven. In fact, for each different size pipe there is only one proper connecting pin for engaging the detent. Unfortunately, the selection of the proper connecting pin involves a certain amount of guesswork and trial and error manipulation of the tool on the part of the workmen, and often results in improperly cut or damaged pipe.

Also, to wrap the cutter chain around the pipe and to select and position the proper connecting pin in the detent requires at least two workmen—one to hold the upper and lower handles and position the clamp jaws adjacent the pipe and another to wrap the cutter chain around the pipe and lift the chain and proper connecting pin into engagement with the detent. Often a third man is required to lift the pipe to allow the chain to be placed therearound and to hold the pipe steady during the actual cutting operation. Even for two or three men, the proper setting, holding, and operation of the conventional chain-type pipe cutting tool is physically taxing, particularly for long and heavy pipes, and requires the exercise of a high degree of care to insure proper cutting of the pipe.

The same problems, of course, are present for each different size pipe. The cutting of different size pipes, however, introduces an additional problem in that for certain size pipes, the proper connecting point of the chain to the upper clamp jaw may fall between connecting pins. To compensate for this eventuality, commercially available chain-type pipe cutting tools generally include a fine adjustment for controlling the spacing of the clamp jaws when in an open condition. The fine adjustment commonly takes a form of a traveling nut stationed in a hole in the upper handle and secured to the connecting arm of the compound leverage arrangement. The traveling nut receives an adjustment screw journaled at one end to the upper handle with an opposite end bearing on the bottom of the hole receiving the nut. A turning of the adjustment screw produces a rotation of the connecting arm relative to the upper handle and in turn produces change in the spacing between the front ends of the clamp jaws. In this manner, the spacing of the clamp jaws can be adjusted such that a particular connecting pin properly fits into the detent to provide for proper cutting of the pipe with a closing of the clamp.

The spacing of the clamp jaws in an open condition which provides for proper placement of a connecting pin in the detent and for accurate and clean cutting of a pipe upon the closing of the clamp may be termed the "optimum" jaw spacing for the particular size pipe. The optimum jaw spacing is slightly different for each size pipe. Unfortunately, the proper adjustment of the adjustment screw required to provide such optimum spacing involves guesswork and trial and error manipulation upon the part of the workman. In particular, for each size pipe, the workman must first select a chain connecting pin he believes is proper. Then, if the pin does not fit exactly into the detent in a manner which appears will produce a proper cutting of the pipe with a closing of the clamp, the workman must adjust the spacing of the jaws in a manner which he hopes will produce the proper cutting. This requires both time and a great deal of good judgment on the part of the workman and unfortunately in practice, often results in the improper cutting of the pipe.

In view of the foregoing, it is a general object of the present invention to provide an improved chain-type pipe cutting tool which overcomes the problems of presently available cutting tools of a similar type.

Another object of the present invention is to provide an improved chain-type pipe cutting tool, which may be easily and accurately preset to cut pipe, or other fracturable members, of different predetermined sizes without guesswork or trial and error manipulation of the cutting tool.

A further object of the present invention is to provide an improved chain-type pipe cutting tool of the foregoing type, which may be easily and reliably operated by one man.

Still another object of the present invention is to provide an improved chain-type pipe cutting tool having a novel chain holder which includes means for indicating the proper portions of the cutter chain for engaging the upper jaw of the associated clamp to insure accurate cutting of different predetermined size pipes and which is adapted to carry and hold the proper portion of the cutter chain in engagement with the upper jaw of the clamp.

A still further object of the present invention is to provide an improved chain-type pipe cutting tool including a frame for supporting and orienting the cutting tool and different size pipes relative to each other to insure repeatedly accurate and reliable operation of the cutting tool, and which allows the cutting tool to be easily pipe loaded and operated by one man.

Still another object of the present invention is to provide an improved chain-type pipe cutting tool including means indicating the optimum jaw spacing for the clamp jaws for different predetermined size pipe, thereby insuring an accurate, clean cutting of pipes of different predetermined size without trial and error guesswork on the part of the workman using the cutting tool.

The foregoing as well as other objects and advantages of the present invention may be more clearly understood by reference to the following detailed description, when taken with the drawings, in which, by way of example only, illustrates one form of improved chain-type pipe cutting tool embodying the features of the present invention.

In the drawings, the improved chain-type pipe cutting tool is represented generally by the numeral 10 and includes a conventional chain-type pipe cutting tool 12, a support frame 14, a chain holder 16 and a jaw spacing indicator 18.

Briefly, the frame 14 provides vertical support for the cutting tool 12 and enables the workman to leave the tool unattended in a fully open condition while he properly positions the pipe to be cut, wraps the cutter chain therearound and connects the proper chain connecting pin to the upper jaw of the cutting tool. In this regard, the frame 14 also supports and orients the pipe in a horizontal plane above a base of the frame normal to and adjacent the front end of the clamp jaws of the cutting tool. This makes for easier wrapping of the cutter chain around the pipe without lifting the pipe and insures that the chain will cut the pipe perpendicular to the axis of the pipe.

The chain holder 16 aids in the set-up and preadjustment of the cutting tool 12 by physically supporting the end portion of the cutter chain and includes means for indicating the proper connecting pin of the chain for connection to the upper jaw of the cutting tool for the particular size pipe being cut. In this manner, the chain holder 16 does away with the guesswork and trial and error manipulation commonly associated with the selection of the proper connecting pin and helps insure an accurate and clean breaking of the pipe upon a closing of the clamp jaws.

The jaw spacing indicator 18 also aids in the proper presetting and adjustment of the cutting tool 12 by providing an indication of the optimum jaw spacing for different predetermined size pipes.

More specifically, the cutting tool 12 is of the type described in detail in the U.S. Patent No. 3,048,920, issued to C. J. Wheeler, Aug. 14, 1962, and reference should be made thereto for a complete understanding of the cutting tool 12. Briefly, however, the cutting tool 12 includes a lengths of flexible, nonextendable, cutter chain 20 and a compound leverage type, manually operable clamp 22 for tension-squeezing the chain around and against a pipe to sever the pipe upon the closing of the jaws of the clamp. The cutter chain 20 comprises a plurality of disc-shaped cutter elements 24, connecting links 26 between the cutter elements, and transverse connecting pins 28 extending through the cutter elements and connecting links beyond opposite sides thereof.

The clamp 22 includes upper and lower elongated handles 30 and 32, a lower clamp jaw 34 and a pair of congruent upper clamp jaws 36 and 38 spaced evenly on opposite sides of the lower jaw. The handles include generally triangular front-end portions 40 and 42 pivotally connected at a common point by a connecting bolt 44. The upper and lower clamp jaws are also pivotally connected at a common point intermediate their front and rear ends by a connecting bolt 46.

In addition, the rear end of the lower jaw 34 is pivotally secured to the end portion 42 of the lower arm 32 by a connecting pin 48. As illustrated most clearly in FIGURE 3, the front end 50 of the lower jaw 34 is bifurcated to receive a cutter element 24 and the end of a pair of connecting links 26 with opposite ends of a transverse connecting pin 28 extending through communicating horizontal side openings 52 and 54 to pivotally secure one end of the cutter chain 20 to the front end of the lower jaw.

The front ends of the upper jaws 36 and 38, on the other hand, include aligned detents 55 for releasably engaging and receiving the opposite ends of a particular connecting pin 28 of the cutter chain 20, after the chain has been wrapped around the pipe being cut. The particular connecting pin 28 is determined by the size of the pipe and is the particular pin which allows the chain to encircle the pipe upon a closing of the clamp jaws to develop uniform radial pipe-breaking pressure on the pipe.

The rear ends of the upper jaws 36 and 38 are pivotally connected by a bolt 56 (see FIGURE 7) between the front end of a pair of congruent connecting arms 58 and 60 stationed on opposite sides of the triangular end portion 40 of the upper handle 30. The rear end of the connecting arms 58 and 60 are pivotally secured to the main body of the upper handle 30 by a connecting pin 62.

A fine adjustment assembly 64 is provided for the clamp 22 between the connecting arms 58 and 60 and the end portion 40 of the upper arm 30. The fine adjustment assembly 64 includes an open window 66 in the end portion 40 in which is mounted an adjustment screw 68 arranged to be operated by a lever arm 70. The adjustment screw 68 is held in the window 66 by means of a cap nut 72 and receives a traveling nut 74 within the window 66. The nut 74, in turn, carries a pair of transverse pins 75 secured to the connecting arms 58 and 60. The bottom end of the adjustment screw 68 engages the bottom surface 76 of the window 66 whereby as the adjustment screw is turned, the connecting arms 58 and 60 are moved relative to the upper handle 30 to move the clamp jaws 34 and 36, 38 relative to each other without movement of the handles. As previously described, the fine adjustment assembly 64 provides means for controlling the spacing between the front ends of the clamp jaws to provide an optimum jaw spacing therebetween for the different size pipes to be cut by the cutting tool 12.

In the improved chain-type pipe cutting tool 10, the cutting tool 12 is vertically supported by the frame 14 above the ground. To this end, the frame 14 preferably includes a horizontal, generally T-shaped base 78 comprising an elongated U-shaped track or channel 80 and a pair of transverse laterals 82 and 84. The lateral 82 is connected to the front end of the track 80 while the lateral 84 extends from opposite sides of the track intermediate its front and rear ends.

Figures 3, 4, 5, 6, 7:
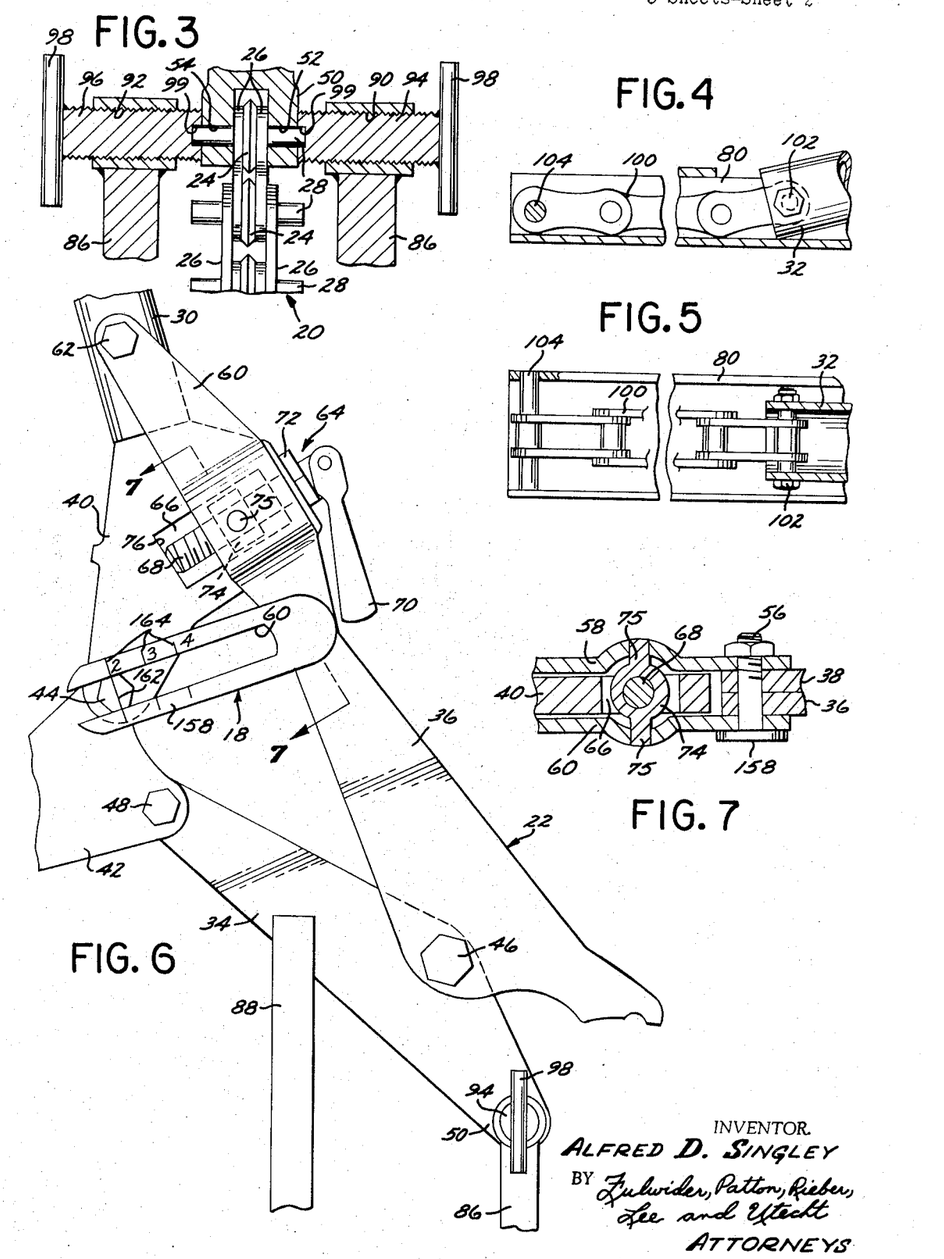
FIGURE 3 is a fragmentary sectional view taken along the line 3—3 in FIGURE 2.
FIGURE 4 is a fragmentary sectional view taken along the lines 4—4 in FIGURE 1.
FIGURE 5 is a fragmentary sectional top view of the portion of the cutting tool illustrated in FIGURE 4.
FIGURE 6 is a fragmentary side view of the cutting tool illustrated in FIGURE 1.
FIGURE 7 is a fragmentary sectional view taken along the line 7—7 in FIGURE 6.
Figure 8:
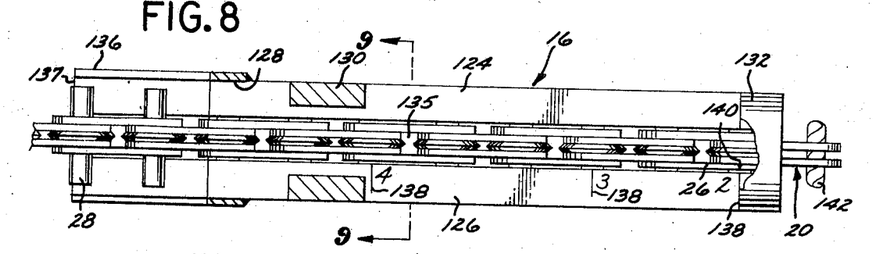
FIGURE 8 is a top view of the chain holder for the cutting tool with portions broken away to illustrate the inner construction of the holder.
Figure 9:
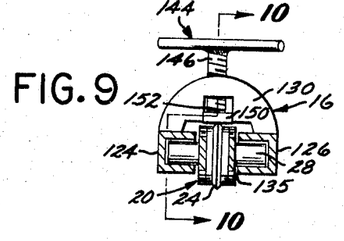
FIGURE 9 is a sectional view taken along the line 9—9 in FIGURE 8.
Figure 10:
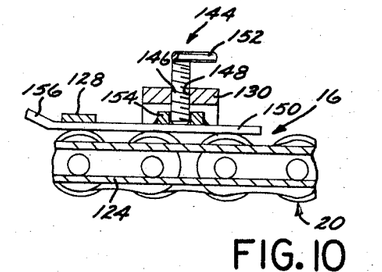
FIGURE 10 is a sectional view taken along the line 10—10 in FIGURE 9.

Two pairs of verticals 86 and 88 extend upward from opposite sides of the track 80. The verticals 86 are immediately over the lateral 84 and, as illustrated most clearly in FIGURE 3, provide means for pivotally supporting the lower jaw 34 for swinging movement in a vertical plane above the base 78 of the frame 14. In this regard, the upper ends of the verticals 86 include horizontally aligned threaded holes 90 and 92 for receiving threaded shafts 94 and 96, respectively. The outer ends of the shafts 94 and 96 include finger grippable levers 98 for turning the shafts while the inner ends of the shafts include aligned recesses 99 for receiving opposing ends of the transverse connecting pin 28 extending beyond the sides of the front portion 50 of the lower jaw 34. The verticals 88 are spaced slightly to the rear of the verticals 86 and act as vertical guides for the clamp jaws during opening and closing of the clamp 22.

The frame 14 also provides physical support for the lower handle 32. To this end, the rear end of the lower handle is stationed in the rear end of the track 80 and has a flexible, nonextendable chain 100 secured thereto by a bolt 102. An opposite end of the chain 100 is secured to the rear end of the track 80 by a pin 104. The chain 100 is thus arranged to permit sliding movement of the end of the lower handle 32 within the track 80 yet limits the forward travel of the handle toward the verticals 86 to, in turn, limit the maximum separation between the handles with the front end of the upper clamp jaws 36 and 38 lying forward of and above the front end 50 of the lower clamp jaw 34. This arrangement insures the same separation of the handles for each loading operation of the cutting tool 12 and provides a reference for the fine adjustment assembly 64 to produce the optimum jaw spacing between the front ends of the upper and lower clamp jaws.

Thus arranged, the frame 14 provides a sturdy support for the cutting tool 12 enabling the workman using the cutting tool to fully open to clamp 22 by spreading apart the handles 30 and 32 and to leave the tool unattended while he properly positions a pipe adjacent the jaws of the clamp and wraps the chain 20 therearound thereby readying the cutting tool for operation in severing the pipe.

In addition, the frame 14 includes an adjustable support 108 for horizontally supporting pipe of different sizes above the base 78, normal to and adjacent the front ends of the lower and upper clamp jaws. In general, the support 108 makes it easier to wrap the chain 20 around the pipe and does away with the necessity of lifting the pipe both during the wrapping of the chain around the pipe and during the cutting operation. The support 108 also does away with the need for a separate workman to horizontally support and secure the pipe while the cutting tool 12 is in operation.

Figures 1, 2:
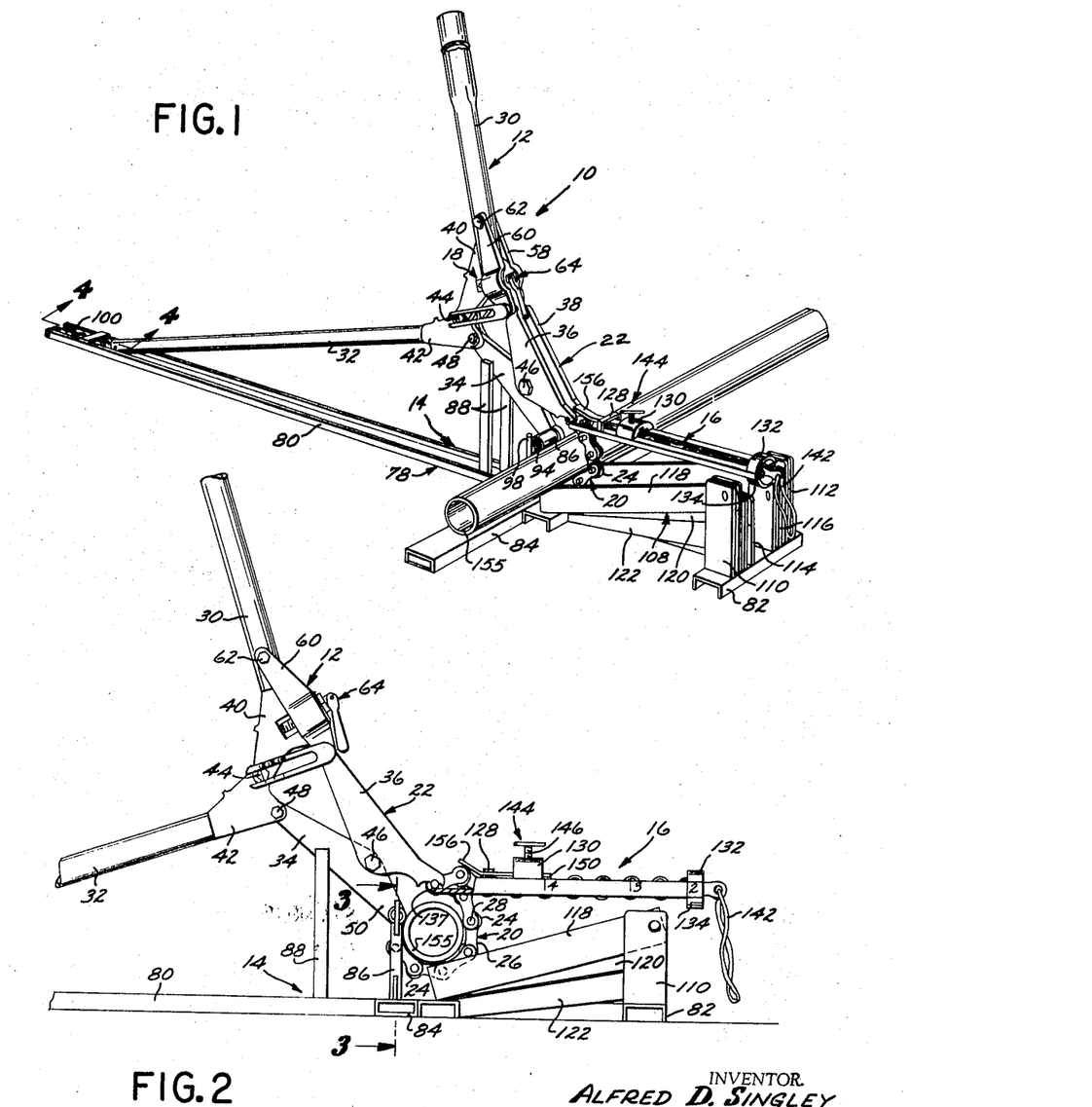
FIGURE 1 is a perspective view of the improved chain-type pipe cutting tool.
FIGURE 2 is a fragmentary side view of the cutting tool illustrated in FIGURE 1.
Figures 11, 12, 13:
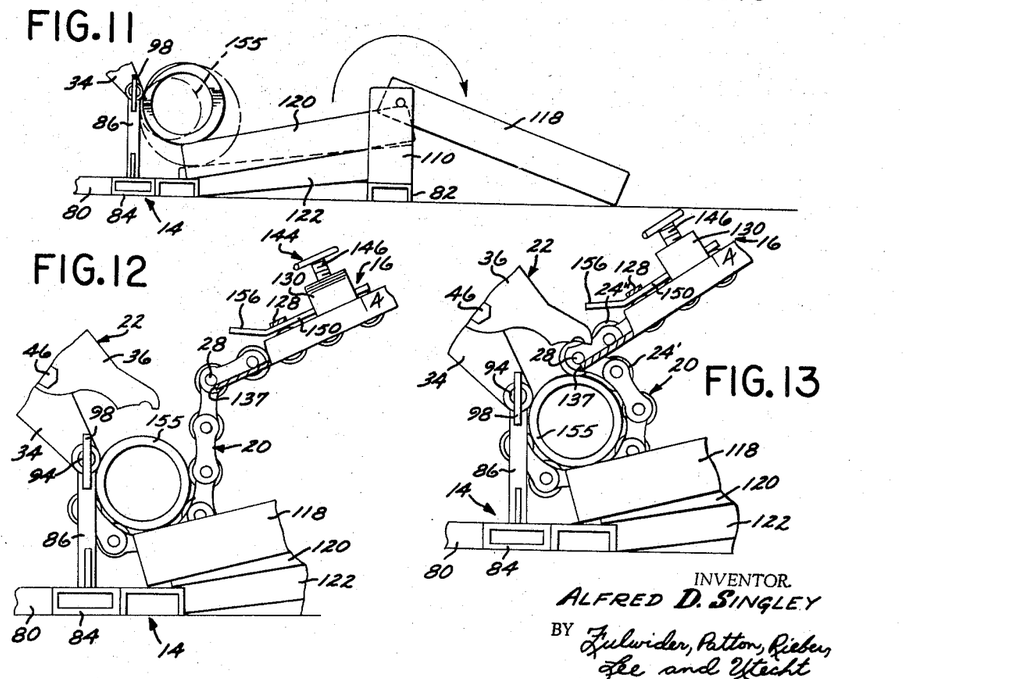
FIGURE 11 is a fragmentary side view of the pipe supporting portion of the cutting tool.
FIGURES 12 and 13 are similar fragmentary side views of the clamp, pipe support and chain holder illustrating the manner in which the chain holder supports the chain and carries a particular connecting pin into engagement with the detent on the front of the upper jaw of the clamp.

To this end, and as most clearly illustrated in FIGURES 1, 2 and 11 the support 108 includes two pair of outer, tall verticals 110 and 112 and two pair of inner, relatively short verticals 114 and 116, all extending from the upper surface of the lateral 82. The tall vertical 110 and the short vertical 114 are stationed on one side of the track 80 while the tall vertical 112 and the short vertical 116 are stationed on an opposite side of the track 80. Each pair of verticals 110–116 pivotally supports a different elongated arm near its upper end to extend downward toward the base 78 and the verticals 86. The arms pivotally supported by the verticals 110 and 112 are of similar design and are indicated by the numeral 118. The arms ally supported by the verticals 114 and 116 are also of a similar design and are denoted by the numeral 120. A separate pair of inclined arms 122 extends from the base 78 adjacent the lateral 84 upward and are secured to the top of the lateral 82 adjacent the verticals 114 and 116.

Each pair of arms 118, 120 and 122 are employed in horizontally supporting different predetermined size pipes immediately adjacent the front end 50 of the lower jaw 34 under the front end of the upper jaw 36. Also, the different arms 118–122 are designed to maintain a substantially uniform spacing between the top of the various size pipes and the front end of the upper jaw 36 to make for easy wrapping of the chain 20 around the pipe and insertion of the appropriate connecting pin 28 into the detents 55.

In particular, as most clearly illustrated in FIGURE 11, the arms 122 are employed to support a large size pipe, such as a four-inch pipe, with the arms 118 and 120 pivoted away from the clamp 22. The arms 120 are utilized to support an intermediate size pipe, such as a three-inch pipe, with the arms 118 pivoted away from the clamp. The arms 118 on the other hand, are utilized to support a small size pipe, such as a two-inch pipe. Since the arms 118 are pivoted from a higher point than are the arms 120, the arms 118 support the lowermost surface of the two-inch pipe slightly above the horizontal supporting plane provided for a three-inch pipe by the arms 120. Similarly, since the upper end of the inclined arms 122 lie below the upper ends of both the arms 118 and 120, the lowermost surface of the four-inch pipe is still closer to the base 78 than that of a three-inch pipe. In this manner, proper selection of the arms 118, 120 and 122 provides means for maintaining the uppermost surface of the different size pipes substantially the same distance below the front end of the upper jaw 36 of the clamp 22. This provides a substantially uniform space for the insertion of the appropriate connecting pin 28 of the cutter chain 20 into the detent 55 by the chain holder 16 and, incidentally, allows the chain holder 16 to balance on the top of the different size pipes and to hold the appropriate connecting pin within the detents 55 during the cutting operation of the pipe by the cutting tool 12.

The chain holder 16 is generally channel shaped and adapted to longitudinally receive the end portion of the cutter chain 20 removed from the lower jaw 34 of the clamp 22. More particularly, as illustrated most clearly in FIGURES 1, 2, 8–10, 12 and 13, the chain holder 16 includes a pair of opposing, generally U-shaped, side members 124 and 126 connected together by bridges 128, 130 and 132, the bridge 132 being semicircular and combining with a semicircular bottom bridge 134 to form a circular end guard for the chain 20 exiting from that end of the chain holder. The U-shaped side members 124 and 126 are adapted to slidably receive opposing end portions of the connecting pins 28 of the cutter chain 20 to allow the holder to slide freely relative to and along the chain with lower portions of the cutter elements 24 extending slightly below the bottom of the holder 16 through an elongated opening 135 defined by the side members.

The end portion 136 of the holder 16 facing the clamp 22 is slightly enlarged and has an open top for exposing the portion of the chain 20 lying within the end portion. This allows the workman to view the position of the connecting pins 28 adjacent the edge 137 of the end portion 136 while the holder 16 is being moved along the cutter chain.

As previously indicated, the chain holder 16 includes means for indicating the proper connecting pin 28 for engagement with the detents 55 for different predetermined size pipes and thereby does away with much of the guesswork and trial and error manipulation associated with conventional chain-type pipe cutting tools. In this regard, the side member 126 includes markings 128 both on the top and side of the member with indicia corresponding to the different predetermined size pipe which the cutting tool is designed to sever. In this case, the marks are identified by the numerals 2, 3 and 4 to indicate two-inch, three-inch and four-inch pipe. A mark 140 is also etched on the top of the connecting link 26 for the end link of the cutter chain 20. The markings 138 are spaced along the side member 26 at predetermined intervals such that when the mark 140 is aligned therewith the appropriate connecting pins 28 for engaging the detents 55 for two-inch, three-inch, and four-inch pipe are immediately over and parallel to the squared-edge 137 of the end portion 136 of the chain holder.

In particular, when the mark 140 on the end chain link is aligned with the mark 138 indicated by the numeral 2, a particular connecting pin 28 is over the edge 137 and is the particular connecting pin dictated by the circumference of a two-inch pipe as being the proper pin for engagement with the detents 55—meaning that when the particular connecting pin 28 is engaged by the detents 55, a closing of the clamp 22 will produce uniform radially inward squeezing pressure on the pipe sufficient to cleanly and accurately sever a two-inch pipe upon a closing of the clamp 22. Likewise, when the mark 140 is aligned with the mark 138 indicated by the numeral 3, a different connecting pin 28 lies over the edge 137 and is the particular connecting pin dictated by the circumference of a three-inch pipe as being the proper pin for engagement with the detents 55 to produce a clean, accurate cutting of a three-inch pipe upon the closing of the clamp 22. Similarly, when the mark 140 is aligned with the mark 138 indicated by the numeral 4, the proper connecting pin 128 for a four-inch pipe is over the edge 137 of the end portion 136 of the chain holder 16.

When the mark 140 is aligned with the mark 138 indicated by the numerals 3 and 4, the end of the chain 20 lies within the holder 16. In order that the workman may old onto the chain while moving the older to these positions, a length of cord 142 is secured to the end of the chain and follows the chain into the holder to provide the workman with means for grasping the chain to draw the chain from the holder when it is desired to position the chain for the cutting of two-inch pipe.

When the cutter chain 20 is properly positioned within the holder 16 for the cutting of a predetermined size of pipe, it is of course desired to lock the chain in that position. To this end, the chain holder 16 supports a clamp assembly 144 comprising an adjustment screw 146 threadedly received by a vertical bore 148 in the top of the bridge 130, and a leaf arm 150 extending under the bridges 128 and 130 and along the cutter chain 20 over the cutter elements 24. The top end of the adjustment screw 146 carries a lever arm 152 for turning the adjustment screw while the lower end is stationed for rotary movement within a cup 154 fixed to the top of the leaf arm 150. A turning of the lever arm 152 causes the adjustment screw 146 to raise or lower the leaf arm 150 relative to the bridge 130 to either release or press the leaf arm tightly against the top of the cutter elements 24 to lock the cutter chain 20 within the chain holder 16.

In addition to providing means for indicating the proper connecting pin 28, dictated by the size of the pipe being cut, for engagement with the upper clamp jaw 36 and the assembly 144 for locking the chain 20 within the holder 16, the chain holder is also adapted to hand-carrying the particular connecting pin into engagement with the detents 44 of the upper clamp jaw and to hold the particular connecting pin in that position during the cutting operation of the pipe. This is most clearly illustrated in FIGURES 12, 13 and 2, which when taken together illustrate the step-by-step positioning of the particular connecting pin 28 in the detents 44 for a two-inch pipe 155.

As illustrated, after first positioning the mark 140 in line with the mark 138 indicated by the numeral 2 and locking the chain 20 within the holder 16 by use of the clamp assembly 144, the workman grasps the holder to lift the chain around the pipe 155. He then moves the holder 16 toward the clamp 22, carrying the connecting pin lying over the edge 137 of the holder, under the upper jaw 36 and over the pipe 155. (See FIGURE 13.) Next, the workman lifts the end 137 of the holder 16 and lowers the hand held end to carry the appropriate connecting pin 28 into engagement with the detents 55. As this occurs, the topmost surface of a cutter element 24' tightly presses against the bottommost surface of a cutter element 24" extending through the bottom slot 135 in the holder 16. The cutter element 24' is the element engaging the pipe 155 adjacent the appropriate element 24 and the element 24" is the cutter element on an opposite side of the appropriate element 24.

In response to the upward pressure of the cutter element 24', the cutter element 24" moves upward within the holder 16 and its topmost surface presses tightly against an upwardly inclined, forward end portion 156 of the leaf arm 150 as the hand-held end of the holder moves downward and pivots around the contact point between the cutter element 24' and 24". This locks the cutter element 24" between the cutter element 24' and the leaf arm 150 and prevents relative movement of the cutter element 24" and the holder 16 during the closing of the clamp 22. This arrangement also locks the appropriate connecting pin 28 within the detents 155 and prevents the accidental release of the pin upon a closing of the clamp 22.

In particular, the center of gravity of the holder 16 is to the right of the pivot defined by the cutter elements 24' and 24", when viewed in FIGURES 12, 13 and 2. Therefore, the weight of the holder 16 tends to produce a counterclockwise rotation of the holder about the pivot point and continuously urges the edge 137 upward to positively lock the opposing ends of the appropriate connecting pin 28 within the detents 44. In this position, the holder 16 balances over the pipe 155 and moves therearound with a closing of the clamp 22.

The upward incline of the end 156 of the leaf arm 150 also has been found to be important in maintaining a positive lock between the cutter elements 24' and 24" and between the appropriate connecting pin 28 and the detents 44. In particular, it has been found that when the lever arm is straight, the connecting pin 28 tends to ride out of the detents with a closing of the clamp 22 and a rotation of the holder 16 around the pipe. A similar result often occurs if the cutter element 24" does not engage the leaf arm 150. When the cutter elements 24' and 24" are locked against each other and the inclined portion 156 of the leaf arm 150, however, the connecting pin 28 remains locked in the detents 55 as the holder 16 travels around the pipe 155 upon a closing of the jaws of the clamp 22.

As with conventional chain-type pipe cutting tools, fine adjustment means 64 for the clamp jaw spacing is included to insure a clean accurate cutting of different size pipes when the proper connecting point for the cutter chain 20 to the upper jaw 36 is displaced slightly from a connecting pin 28 of the chain. The fine adjustment also provides means for slightly increasing the spacing between the front ends of the clamp jaws to more easily accommodate large pipes. In conventional chain-type pipe cutting tools, the fine adjustment involves a certain degree of guesswork and trial and error manipulation on the part of the workman. In the present invention, however, this guesswork and trial and error manipulation is done away with by the inclusion of the jaw spacing indicator 18. The jaw spacing indicator 18 provides a visual indication of the optimum spacing of the clamp jaws for different predetermined size pipe and thereby enables the workman to rapidly and accurately preset the spacing of the jaws for an accurate and clean cutting of the different size pipe.

In the illustrated form, the indicator 18 includes a U-shaped, indicia carrying element 158, one end of which is welded or otherwise secured to the head of the bolt 56 which pivotally secures the connecting arm 60 to the upper jaw 36. A slot 160 in the element 158 slidably receives the head of the bolt 44 which pivotally secures together the end portions 40 and 42 extending from the upper and lower handles 30 and 32, respectively. A slot or mark 162 on the head of the bolt 44 is adapted to be aligned with appropriate markings 164 and indicia on the element 158 indicating the proper spacing for the clamp jaws for two-inch, three-inch and four-inch pipe. Thus, for example, when it is desired to cut a two-inch pipe, the fine adjustment assembly 64 is adjusted to bring the mark 162 into alignment with the mark 164 associated with the indicia 2. The mark 164 is located relative to the mark 162 such that the spacing of the front ends of the lower and upper jaws corresponds to the optimum spacing for the jaws for accurately cutting two-inch pipe when the particular connecting pin 28 indicated by the chain holder 16 for two-inch pipe is locked within the detents 55 on the upper jaw. Similar critical relationships exist between the mark 162 and the marks 164 for the three and four-inch pipe, and the corresponding connecting pins 28 indicated by the chain holder 16.

Thus, by way of summary, when it is desired to cut two-inch pipe, the fine adjustment is controlled until the jaw spacing indicator 18 brings the mark 162 into alignment with the mark 164 corresponding to the two-inch pipe setting. The chain holder 16 is then slipped along the end portion of the cutter chain 20 until the mark 140 is aligned with the mark 138 for two-inch pipe. The clamp 144 is then operated to lock the chain 20 in place and the workman simply carries the appropriate connecting pin 28 into engagement with the detents 55 by moving the chain holder 16 through the steps indicated by FIGURES 12, 13 and 2. The workman next leaves the chain holder in place and grasps the upper handle 30. By moving the upper handle toward the lower handle 32, the upper and lower jaws of the clamp 22 are brought together to exert tension forces on the cutter chain 20 which in turn produces uniform, radially inwardly, squeezing pressure on the pipe 155, causing the pipe to break cleanly along a line normal to the axis of the pipe. Since the fine adjustment assembly 64 and chain holder 16 are still set, this operation may be reliably repeated again and again for two-inch pipe. When it is desired to cut either a three or four-inch pipe, the fine adjustment is changed to the appropriate indication and the chain moved within the chain holder to a similar indication. The foregoing process is then repeated.

From the foregoing, it is appreciated therefore that the present invention provides an improved chain-type pipe cutting tool which may be easily and accurately preset to cut pipe of different predetermined size, without guesswork or trial and error manipulation of the cutting tool by the workman. This enables the workman to rapidly, accurately and reliably cut pipes of predetermined size in a minimum time, while expending a minimum amount of physical effort. Further, the frame included in the cutting tool allows a single workman to easily and reliably perform the work previously requiring two or three workmen.

In the foregoing, a particular form of improved chain-type pipe cutting tool has been described in some detail. Changes and midifications may, of course, be made from the illustrated form without departing from the spirit of the invention. It is therefore intended that the present invention be limited in scope only by the terms of the following claims.

I claim:
1. A cutting tool for parting an elongated, fracturable member, comprising:
 a flexible, substantially nonextendible, cutter adapted to be placed around and tension-squeezed against said fracturable member to fracture and part said member;
 a clamp for tensioning said cutter to squeeze and part said member upon a closing of said clamp, said clamp comprising a first clamp jaw secured to said cutter and a second clamp jaw spaced from said first clamp jaw and including cutter engaging means for releasably engaging a particular portion of said cutter after being placed around said member, said particular portion being dictated by the size of said member;
 and a holder for said cutter remote from said first clamp jaw, said holder including means for indicating the particular portion of said cutter dictated by the size of said member for engagement with said cutter engaging means.

2. A cutting tool for parting an elongated, fracturable member, comprising:
 a flexible substantially nonextendible cutter adapted to be placed around and tension-squeezed against said fracturable member to fracture and part said member;
 a clamp for tensioning said cutter to squeeze against and part said member upon a closing of said clamp, said clamp comprising a first clamp jaw secured to said cutter and a second clamp jaw spaced from said first clamp jaw and including cutter engaging means for releasably engaging a particular portion of said cutter after being placed around said member, said particular portion being dictated by the size of said member;
 and a holder for said cutter remote from said first jaw, said holder being movable relative to said cutter and including means for indicating the particular portion of said cutter dictated by the size of said member for engagement with said cutter engaging means, and further being adapted to carry said particular portion of said cutter into engagement with said cutter engaging means.

3. A cutting tool for parting an elongated, fracturable member, comprising:
 a flexible, substantially nonextendible, cutter adapted to be placed around and tension-squeezed against said fracturable member to fracture and part said member;
 a clamp for tensioning said cutter to squeeze and part said member upon a closing of said clamp, said clamp comprising a first clamp jaw secured to said cutter and a second clamp jaw spaced from said first clamp jaw and including cutter engaging means for releasably engaging a particular portion of said cutter after being placed around said member, said particular portion being dictated by the size of said member;
 a holder for said cutter remote from said first clamp jaw, said holder including means for indicating the particular portion of said cutter dictated by the size of said member for engagement with said cutter engaging means;
 means for adjusting the spacing between said first and second clamp jaws when in an opened condition to provide an optimum jaw spacing for fracturable members of different size;
 and spacing indicator means connected to said first and second clamp jaws for indicating the optimum spacing of said jaws for members of different predetermined sizes.

4. A cutting tool for parting an elongated, fracturable member, comprising:
 a cutter chain adapted to be wrapped around and tension-squeezed against said fracturable member to fracture and part said member, said chain comprising a plurality of spaced cutter elements, connecting links between said cutter elements, and transverse connecting pins extending through and projecting beyond said links and cutter elements;
 a clamp for tensioning said chain to squeeze against and part said member upon a closing of said clamp, said clamp comprising a first clamp jaw pivotally secured to said chain and a second clamp jaw spaced from said first clamp jaw and including pin engaging means for releasably engaging a particular connecting pin of said chain when said chain is wrapped around said member, said particular pin being dictated by the size of said member;

and a generally channel-shaped holder for longitudinally and slidably receiving an end portion of said chain remote from said first clamp jaw such that said holder is movable relative to and along said chain, said holder including means for indicating when the particular connecting pin dictated by the size of said member is adjacent an edge of said holder facing said clamp.

5. The cutting tool of claim 4 wherein said holder further includes means for releasably locking said chain within said holder.

6. A cutting tool for parting an elongated, fracturable member, comprising:
   a cutter chain adapted to be wrapped around and tension-squeezed against said fracturable member to fracture and part said member, said chain comprising a plurality of spaced cutter elements, connecting links between said cutter elements, and transverse connecting pins extending through and projecting beyond said links and cutter elements;
   a clamp for tensioning said chain to squeeze against and part said member upon a closing of said clamp, said clamp comprising a first clamp jaw pivotally secured to said chain and a second clamp jaw spaced from said first jaw and including pin engaging means for releasably engaging a particular connecting pin of said chain when said chain is wrapped around said member, said particular pin being dictated by the size of said member;
   and a generally channel-shaped holder for longitudinally and slidably receiving an end portion of said chain remote from said first clamp jaw such that said holder is movable relative to and along said chain, said holder including an elongated opening in its bottom for receiving bottom portions of said cutter elements, means for indicating when the particular connecting pin dictated by the size of said member is adjacent an edge of said holder facing said clamp, and means for locking said chain within said holder including a leaf arm for pressing against the tops of said cutter elements to lock said chain within said holder, said leaf arm having an upwardly inclined end portion adjacent said edge of said holder facing said clamp.

7. A cutting tool for parting an elongated, fracturable member, comprising:
   a cutter chain adapted to be wrapped around and tension-squeezed against said fracturable member to fracture and part said member, said chain comprising a plurality of spaced cutter elements, connecting links between said cutter elements, and transverse connecting pins extending through and projecting beyond said links and cutter elements;
   a clamp for tensioning said chain to squeeze against and part said member upon a closing of said clamp, said clamp comprising a first clamp jaw pivotally secured to said chain and a second clamp jaw spaced from said first clamp jaw and including pin engaging means for releasably engaging a particular connecting pin of said chain when said chain is wrapped around said member, said particular pin being dictated by the size of said member;
   a generally channel-shaped holder for longitudinally and slidably receiving an end portion of said chain remote from said first clamp jaw such that said holder is movable relative to and along said chain, said holder including means for indicating when the particular connecting pin dictated by the size of said member is adjacent an edge of said holder facing said clamp;
   means for adjusting the spacing between said first and second clamp jaws when in an open position to provide an optimum jaw spacing for members of different size;
   and spacing indicator means connected to said first and second clamp jaws for indicating the optimum spacing of said jaws for members of different predetermined sizes.

8. In a vise-like apparatus for securely holding members of different circumference and including a length of flexible substantially nonextendible material adapted to be placed around and tension-squeezed against said member and a clamp for tensioning said flexible material to squeeze against said member upon a closing of said clamp, said clamp comprising a first clamp jaw secured to said flexible material and a second clamp jaw spaced from said first clamp jaw and including means for releasably engaging a particular portion of said flexible material after being placed around said member, said particular portion being dictated by the circumference of said member, the combination of:
   a holder for an end portion of said flexible material remote from said first clamp jaw, said holder including means indicating the particular portion of said flexible material dictated by the circumference of said member for engagement with said means for engaging said material;
   and means connected to said holder for releasably locking said end portion of said flexible material within said holder.

9. In a vise-like apparatus for securely holding members of different circumference and including a chain adapted to be wrapped around and tension-squeezed against said member, a clamp for tensioning said chain to squeeze against said member upon a closing of said clamp, said clamp comprising a first clamp jaw pivotally secured to said chain and a second clamp jaw spaced from said first clamp jaw and including pin engaging means for releasably engaging a particular connecting pin of said chain when said chain is wrapped around said member, said particular pin being dictated by the circumference of said member, the combination of:
   a generally channel-shaped holder for longitudinally and slidably receiving the end portion of said chain remote from said first clamp jaw such that said holder is movable relative to and along said chain, said holder including means for indicating when said particular connecting pin dictated by the size of said member is adjacent an edge of said holder facing said clamp;
   and means for releasably locking said chain within said holder.

10. A cutting tool for parting an elongated fracturable member, comprising:
    a flexible, substantially nonextendible cutter adapted to be placed around and tension-squeezed against said fracturable member to fracture and part said member;
    a clamp for tensioning said cutter to squeeze against said member and part said member upon a closing of said clamp, said clamp including a lower jaw and an upper jaw connected at a common pivot intermediate their front and rear ends, the front end of said lower jaw being secured to said cutter and the front end of said upper jaw including cutter engaging means for releasably engaging a particular portion of said cutter after being placed around said member, said particular portion being dictated by the size of said member;
    upper and lower handles extending from the rear end of said upper and lower jaws for use in closing and opening said clamp;

a frame including a vertical, pivot means extending from said vertical and connected to said front end of said lower jaw to pivotally support said lower jaw for swinging movement in a generally vertical plane, and a generally horizontal track extending rearward of said vertical for receiving and supporting a rear end of said lower handle for sliding movement toward and away from said vertical with opening and closing of said clamp; means connected to said frame for limiting the travel of said rear end of said lower handle toward said vertical with said front end of said upper jaw lying above and forward of said lower jaw;

and support means connected to said frame for horizontally supporting members of different size above a base of said frame, adjacent said vertical and below said front end of said upper jaw.

11. The cutting tool of claim 10 wherein said support means includes means for adjusting the height of members of different size above a base of said frame to maintain substantially the same distance between said front end of said upper jaw and the top of said different size members.

12. A cutting tool for parting an elongated fracturable member, comprising:

a flexible, substantially nonextendible cutter adapted to be placed around and tension-squeezed against said fracturable member to fracture and part said member;

a clamp for tensioning said cutter to squeeze against said member and part said member upon a closing of said clamp, said clamp including a lower jaw and an upper jaw connected at a common pivot intermediate their front and rear ends, the front end of said lower jaw being secured to said cutter and the front end of said upper jaw including cutter engaging means for releasably engaging a particular portion of said cutter after being placed around said member, said particular portion being dictated by the size of said member;

upper and lower handles extending from the rear end of said upper and lower jaws for use in closing and opening said clamp;

a frame including a vertical and a pivot means extending from said vertical and connected to said front end of said lower jaw to pivotally support said lower jaw for swinging movement in a generally vertical plane;

support means connected to said frame for horizontally supporting members of different size above a base of said frame and adjacent said vertical;

and a holder for said cutter remote from said lower jaw, said holder being movable relative to said cutter and including means for indicating the particular portion of said cutter dictated by the size of said member for engagement with said cutter engaging means, and further being adapted to carry said particular portion of said cutter into engagement with said cutter engaging means.

13. A cutting tool for parting an elongated fracturable member, comprising:

a cutter chain adapted to be wrapped around and tension-squeezed against said fracturable member to fracture and part said member, said chain comprising a plurality of spaced cutter elements, connecting links between said cutter elements and transverse connecting pins extending through and projecting beyond said links and cutter elements;

a clamp for tensioning said chain to squeeze against and part said member along a closing of said clamp, said clamp including a lower jaw and an upper jaw connected at a common pivot intermediate their front and rear ends, the front end of said lower jaw being pivotally secured to said chain and the front end of said upper jaw including pin engaging means for engaging a particular connecting pin of said chain after wrapping around said member, said particular pin being dictated by the size of said member;

elongated upper and lower handles extending from the rear ends of said lower and upper jaws for use in closing and opening said clamp;

a frame including a vertical and pivot means extending from said vertical and connected to said front end of said lower jaw to pivotally support said lower jaw for swinging movement in a generally vertical plane;

support means connected to said frame for horizontally supporting members of different size above a base of said frame and adjacent said vertical;

and a generally channel-shaped holder for longitudinally and slidably receiving an end portion of said chain remote from said lower jaw such that said holder is movable relative to and along said chain, said holder including means for indicating when the particular connecting pin dictated by the size of said member is adjacent an edge of said holder facing said clamp and means for releasably locking said chain within said holder.

14. A cutting tool for parting an elongated fracturable member, comprising:

a cutter chain adapted to be wrapped around and tension-squeezed against said fracturable member to fracture and part said member, said chain comprising a plurality of spaced cutter elements, connecting links between said cutter elements and transverse connecting pins extending through and projecting beyond said links and cutter elements;

a clamp for tensioning said chain to squeeze against and part said member along a closing of said clamp, said clamp including a lower jaw and an upper jaw connected at a common pivot intermediate their front and rear ends, the front end of said lower jaw being pivotally secured to said chain and the front end of said upper jaw including pin engaging means for engaging a particular connecting pin of said chain after wrapping around said member, said particular pin being dictated by the size of said member;

elongated upper and lower handles extending from the rear ends of said lower and upper jaws for use in closing and opening said clamp;

a frame including a vertical and pivot means extending from said vertical and connected to said front end of said lower jaw for pivotally supporting said lower jaw for swinging movement in a generally vertical plane;

support means connected to said frame for horizontally supporting members of different size above a base of said frame and adjacent said vertical;

a generally channel-shaped holder for longitudinally and slidably receiving an end portion of said chain remote from said lower jaw such that said holder is movable relative to and along said chain, said holder including means for indicating when the particular connecting pin dictated by the size of said member is adjacent an edge of said holder facing said clamp and means for releasably locking said chain within said holder;

means for adjusting the spacing between said lower and upper jaws when in an open position to provide an optimum jaw spacing for members of different size;

and spacing indicator means connected to said lower and upper jaws for indicating the optimum spacing of said jaws for members of different predetermined sizes.

15. A cutting tool for parting an elongated, fracturable member, comprising:

a cutter chain adapted to be wrapped around and tension-squeezed against said fracturable member to fracture and part said member, said chain comprising a plurality of spaced cutter elements, connecting links between said cutter elements, and transverse connecting pins extending through and projecting beyond said links and cutter elements;

upper and lower handles pivotally connected to each other near a front end;

a clamp for tensioning said chain to squeeze against and part said member upon a closing of said clamp, said clamp comprising a lower jaw pivotally secured at a front end to said chain and at a rear end to said lower handle, an upper jaw connected to said lower jaw at a common pivot point intermediate their front and rear ends and including pin engaging means on the front end thereof for engaging a particular connecting pin of said chain after wrapping around said member, said particular pin being dictated by the size of said member, and a connecting arm pivotally connected at a rear end to said upper handle and at a front end to a rear end of said upper jaw;

a frame including a vertical, pivot means extending from said vertical and connected to said front end of said lower jaw for pivotally supporting said lower jaw for swinging movement in a generally vertical plane, and a generally horizontal track extending rearward of said vertical for receiving and supporting a rear end of said lower handle for sliding movement toward and away from said vertical with opening and closing of said clamp;

means connected to said frame for limiting the travel of said rear end of said lower arm toward said vertical with said front end of said upper jaw lying above and forward of said lower jaw;

support means connected to said frame for horizontally supporting members of different size above a base of said frame, adjacent said vertical and below said front end of said upper jaw;

and a holder for said chain remote from said lower jaw, said holder being movable relative to said chain and including means for indicating the particular connecting pin of said chain dictated by the size of said member for engagement with said pin engaging means, and further being adapted to carry said particular pin into engagement with said pin engaging means.

16. A cutting tool for parting an elongated, fracturable member, comprising:

a cutter chain adapted to be wrapped around and tension-squeezed against said fracturable member to fracture and part said member, said chain comprising a plurality of spaced cutter elements, connecting links between said cutter elements, and transverse connecting pins extending through and projecting beyond said links and cutter elements;

upper and lower handles pivotally connected to each other near a front end;

a clamp for tensioning said chain to squeeze against and part said member upon a closing of said clamp, said clamp comprising a lower jaw pivotally secured at a front end to said chain and at a rear end to said lower handle, an upper jaw connected to said lower jaw at a common pivot point intermediate their front and rear ends and including pin engaging means on the front end thereof for engaging a particular connecting pin of said chain after wrapping around said member, said particular pin being dictated by the size of said member, and a connecting arm pivotally connected at a rear end to said upper handle and at a front end to a rear end of said upper jaw;

a frame including a vertical, pivot means extending from said vertical and connected to said front end of said lower jaw for pivotally supporting said lower jaw for swinging movement in a generally vertical plane, and a generally horizontal track extending rearward of said vertical for receiving and supporting a rear end of said lower handle for sliding movement toward and away from said vertical with opening and closing of said clamp;

means connected to said frame for limiting the travel of said rear end of said lower arm toward said vertical with said front end of said upper jaw lying above and forward of said lower jaw;

support means connected to said frame for horizontally supporting members of different size above a base of said frame, adjacent said vertical and below said front end of said upper jaw;

a holder for said chain remote from said lower jaw, said holder being movable relative to said chain and including means for indicating the particular connecting pin of said chain dictated by the size of said member for engagement with said pin engaging means, and further being adapted to carry said particular pin into engagement with said pin engaging means;

means between said connecting arm and said upper handle for adjusting the rotational position of said arm relative to said upper handle and hence the spacing of said front ends of said lower and upper jaws to provide an optimum spacing between said jaws for different size members;

and spacing indicator means connected to said lower and upper jaws for indicating the optimum spacing between said jaws for members of different predetermined sizes.

17. A cutting tool for parting an elongated fracturable member, comprising:

a cutter chain adapted to be wrapped around and tension-squeezed against said fracturable ember to fracture and part said member, said chain comprising a plurality of spaced cutter elements, connecting links between said cutter elements, and transverse connecting pins extending through and projecting beyond said links and cutter elements;

upper and lower handles pivotally connected to each other near a front end;

a clamp for tensioning said chain to squeeze against and part said member upon a closing of said clamp, said clamp comprising a lower jaw pivotally secured at a front end to said chain and at a rear end to said lower handle and an upper jaw connected to said lower jaw at a common pivot point intermediate their front and rear ends and having pin engaging means on the front end thereof for engaging a particular connecting pin of said chain after wrapping around said member, said particular pin being dictated by the size of said member, and a connecting arm pivotally connected at a rear end to said upper handle and at a front end to a rear end of said upper jaw;

a frame including a vertical, pivot means extending from said vertical and connected to said front end of said lower jaw for pivotally supporting said lower jaw for swinging movement in a generally vertical plane, and a generally horizontal track extending rearward of said vertical for receiving and supporting a rear end of said lower handle for sliding movement toward and away from said vertical with opening and closing of said clamp;

means connected to said frame for limiting the travel of said rear end of said lower arm toward said vertical with said front end of said upper jaw lying above and forward of said lower jaw;

support means connected to said frame for horizontally supporting members of different size adjacent said vertical, below said front end of said upper jaw, and above a base of said frame;

and a generally channel-shaped holder for longitudinally and slidably receiving an end portion of said chain remote from said lower jaw such that said holder is movable relative to and along said chain with said connecting pins of said chain parallel to a rear edge of said holder facing said clamp, said holder including means for indicating when the particular connecting pin dictated by the size of said member is adjacent said rear edge of said holder and means for locking said chain within said holder.

18. A cutting tool for parting an elongated fracturable member, comprising:
  a cutter chain adapted to be wrapped around and tension-squeezed against said fracturable member to fracture and part said member, said chain comprising a plurality of spaced cutter elements, connecting links between said cutter elements, and transverse connecting pins extending through and projecting beyond said links and cutter elements;
  upper and lower handles pivotally connected to each other near a front end;
  a clamp for tensioning said chain to squeeze against and part said member upon a closing of said clamp, said clamp comprising a lower jaw pivotally secured at a front end to said chain and at a rear end to said lower handle and an upper jaw connected to said lower jaw at a common pivot point intermediate their front and rear ends and having pin engaging means on the front end thereof for engaging a particular connecting pin of said chain after wrapping around said member, said particular pin being dictated by the size of said member, and a connecting arm pivotally connected at a rear end to said upper handle and at a front end to a rear end of said upper jaw;
  a frame including a vertical, pivot means extending from said vertical and connected to said front end of said lower jaw for pivotally supporting said lower jaw for swinging movement in a generally vertical plane, and a generally horizontal track extending rearward of said vertical for receiving and supporting a rear end of said lower handle for sliding movement toward and away from said vertical with opening and closing of said clamp;
  means connected to said frame for limiting the travel of said rear end of said lower arm toward and away from said vertical with said front end of said upper jaw lying above and forward of said lower jaw;
  support means connected to said frame for horizontally supporting members of different size adjacent said vertical and below said front end of said upper jaw;
  a generally channel-shaped holder for longitudinally and slidably receiving an end portion of said chain remote from said lower jaw such that said holder is movable relative to and along said chain with said connecting pins of said chain parallel to a rear edge of said holder facing said clamp, said holder including means for indicating that the particular connecting pin dictated by the size of said member is adjacent said rear edge of said holder and means for locking said chain within said holder;
  means between said connecting arm and said upper handle for adjusting the rotational position of said arm relative to said upper handle and hence the spacing of said front ends of said lower and upper jaws to provide an optimum spacing between said jaws for different size members;
  and spacing indicator means connected to said lower and upper jaws for indicating the optimum spacing between said jaws for members of different predetermined sizes.

19. A cutting tool for parting an elongated fracturable member, comprising:
  a cutter chain adapted to be wrapped around and tension-squeezed against said fracturable member to fracture and part said member, said chain comprising a plurality of spaced cutter elements, connecting links between said cutter elements, and transverse connecting pins extending through and projecting beyond said links and cutter elements;
  upper and lower handles pivotally connected to each other near a front end;
  a clamp for tensioning said chain to squeeze against and part said member upon a closing of said clamp, said clamp comprising a lower jaw pivotally secured at a front end to said chain and at a rear end to said lower handle and an upper jaw connected to said lower jaw at a common pivot point intermediate their front and rear ends and having pin engaging means on the front end thereof for engaging a particular connecting pin of said chain after wrapping around said member, said particular pin being dictated by the size of said member, and a connecting arm pivotally connected at a rear end to said upper handle and at a front end to a rear end of said upper jaw;
  a frame including a vertical, pivot means extending from said vertical and connected to said front end of said lower jaw for pivotally supporting said lower jaw for swinging movement in a generally vertical plane, and a generally horizontal track extending rearward of said vertical for receiving and supporting a rear end of said lower handle for sliding movement toward and away from said vertical with opening and closing of said clamp;
  means connected to said frame for limiting the travel of said rear end of said lower arm toward and away from said vertical with said front end of said upper jaw lying above and forward of said lower jaw;
  support means connected to said frame for horizontally supporting members of different size adjacent said vertical and below said front end of said upper jaw, said support means including means for adjusting the height of members of different size above a base of said frame to maintain substantially the same distance between said front end of said upper jaw and the top of said different size members;
  and a generally channel-shaped holder for longitudinally and slidably receiving the end portion of said chain remote from said lower jaw such that said holder is movable relative to and along said chain with said connecting pins of said chain parallel to a rear edge of said holder facing said clamp, said holder including means for indicating that the particular connecting pin dictated by the size of said member is adjacent said rear edge of said holder and means for locking said chain within said holder.

20. A cutting tool for parting an elongated, fracturable member, comprising:
  a cutter chain adapted to be wrapped around and tension-squeezed against said fracturable member to fracture and part said member, said chain comprising a plurality of spaced cutter elements, connecting links between said cutter elements, and transverse connecting pins extending through and projecting beyond said links and cutter elements;
  upper and lower handles pivotally connected to each other near a front end;
  a clamp for tensioning said chain to squeeze against and part said member upon a closing of said clamp, said clamp comprising a lower jaw pivotally secured at a front end to said chain and at a rear end to said lower handle and an upper jaw connected to said lower jaw at a common pivot point intermediate their front and rear ends and having pin engaging means on the front end thereof for engaging a particular connecting pin of said chain after wrapping around said member, said particular pin being dictated by the size of said member, and a connecting arm pivotally connected at a rear end to said upper handle and at a front end to a rear end of said upper jaw;
  a frame including a vertical, pivot means extending from said vertical and connected to said front end of said lower jaw for pivotally supporting said lower jaw for swinging movement in a generally vertical plane, a generally horizontal track extending rearward of said vertical for receiving and supporting a rear end of said lower handle for sliding movement toward and away from said vertical with opening and closing of said clamp;

means connected to said frame for limiting the travel of said rear end of said lower arm toward and away from said vertical with said front end of said upper jaw lying above and forward of said lower jaw;

support means connected to said frame for horizontally supporting members of different size adjacent said vertical and below said front end of said upper jaw and above a base of said frame, said support means being adjustable for members of different size to maintain substantially the same distance between said front end of said upper jaw and the top of said different size members;

a generally channel-shaped holder for longitudinally and slidably receiving the end portion of said chain remote from said lower jaw such that said holder is movable relative to and along said chain with said connecting pins of said chain parallel to a rear edge of said holder facing said clamp, said holder including an elongated opening in its bottom for receiving said cutter elements of said chain, means for indicating when the particular connecting pin dictated by the size of said member is adjacent said rear edge of said holder, and means for locking said chain within said holder including a leaf arm for pressing against the tops of said cutter elements to lock said chain within said holder, and leaf arm having an upwardly inclined end portion adjacent said rear edge of said holder;

means between said connecting arm and said upper handle for adjusting the rotational position of said arm relative to said upper handle and hence the spacing of said front ends of said lower and upper jaws to provide an optimum spacing between said jaws for different size members;

and spacing indicator means connected to said lower and upper jaws for indicating the optimum spacing between said jaws for members of different predetermined sizes.

References Cited

UNITED STATES PATENTS

| | | | |
|---|---|---|---|
| 2,833,034 | 5/1958 | Wheeler | 225—103 |
| 2,836,887 | 6/1958 | Wheeler | 225—103 |
| 3,048,920 | 8/1962 | Wheeler | 225—103 |
| 3,244,339 | 5/1966 | Carner | 225—104 |

WILLIAM W. DYER, JR., *Primary Examiner.*

J. M. MEISTER, *Examiner.*